United States Patent
Slovesko

(10) Patent No.: US 10,676,067 B2
(45) Date of Patent: Jun. 9, 2020

(54) USER CAPTURE DEVICE CONFIGURATION FOR A VEHICLE

(71) Applicant: BYTON NORTH AMERICA CORPORATION, Santa Clara, CA (US)

(72) Inventor: Shawn Slovesko, Santa Clara, CA (US)

(73) Assignee: Byton Limited, Hong Kong (HK)

( * ) Notice: Subject to any disclaimer, the term of this patent is extended or adjusted under 35 U.S.C. 154(b) by 26 days.

(21) Appl. No.: 15/863,831

(22) Filed: Jan. 5, 2018

(65) Prior Publication Data

US 2019/0210563 A1 Jul. 11, 2019

(51) Int. Cl.
| | |
|---|---|
| *B60R 25/25* | (2013.01) |
| *B60R 25/30* | (2013.01) |
| *B60J 5/04* | (2006.01) |
| *B60R 11/04* | (2006.01) |
| *B60R 11/00* | (2006.01) |

(52) U.S. Cl.
CPC ............ *B60R 25/25* (2013.01); *B60J 5/0402* (2013.01); *B60J 5/0405* (2013.01); *B60J 5/0412* (2013.01); *B60R 11/04* (2013.01); *B60R 25/305* (2013.01); *B60R 2011/0021* (2013.01); *B60R 2011/0043* (2013.01); *B60R 2300/8006* (2013.01)

(58) Field of Classification Search
CPC ............ B60R 25/25; B60R 2011/0021; B60R 2011/0043; B60R 11/04; B60J 5/0402; B60J 5/0405; B60J 5/0412
See application file for complete search history.

(56) References Cited

U.S. PATENT DOCUMENTS

| | | | |
|---|---|---|---|
| 2004/0174253 A1 | 9/2004 | Chen | |
| 2009/0046538 A1* | 2/2009 | Breed | B60C 11/24 367/93 |
| 2016/0174253 A1 | 10/2016 | Jones et al. | |
| 2016/0300410 A1* | 10/2016 | Jones | G06K 9/00288 |
| 2017/0274825 A1 | 9/2017 | Woodhouse et al. | |
| 2018/0044964 A1* | 2/2018 | Ikeda | B60J 1/00 |
| 2018/0361931 A1* | 12/2018 | Ajisaka | B60R 1/00 |
| 2019/0032374 A1* | 1/2019 | Linden | E05B 81/76 |
| 2019/0061640 A1* | 2/2019 | Jefferson | B60S 1/56 |

FOREIGN PATENT DOCUMENTS

| | | |
|---|---|---|
| DE | 10026596 C1 | 12/2001 |
| DE | 102013002687 A1 | 8/2014 |
| WO | 2017066286 A1 | 4/2017 |

OTHER PUBLICATIONS

The International Search Report and Written Opinion of application No. PCT/US2018/058594 dated Feb. 5, 2019, 16 pages.

* cited by examiner

*Primary Examiner* — Drew J Brown
(74) *Attorney, Agent, or Firm* — Womble Bond Dickinson (US) LLP

(57) ABSTRACT

Methods and systems are disclosed for facial recognition camera configurations for a vehicle. For one embodiment, a vehicle includes a door assembly. The door assembly includes: a window, a lower door assembly body, an upper door frame and a user capture device. The upper door frame is fixedly attached to the lower door assembly body and surrounding the window. The upper door frame includes a recessed portion in an inner panel of the upper door frame. The recessed portion houses the user capture device for identifying and authenticating users of the vehicle.

22 Claims, 5 Drawing Sheets

USER CAPTURE DEVICE CONFIGURATION FOR A VEHICLE

FIELD

Embodiments of the invention are in the field of user capture devices. More particularly, embodiments of the invention relate to user capture device configurations for a vehicle.

BACKGROUND

Vehicles have become more sophisticated with advanced electronic controls and integrated computers enhancing the driving experience. Such controls and computers can provide an array of user applications with access to vast amounts of information including private information. Security and access to these electronic controls and computers are limited to keys, door lock systems and login/passwords to the computers. If the keys, door locks and login/passwords are compromised, an unauthorized user or driver can gain access and entry to the vehicle including access to electronic controls and computers connected to private information. Valid driver or user identification is needed in vehicles to allow only authorized access to the vehicles and its electronic controls and computers.

SUMMARY

Embodiments and examples are disclosed for a door assembly for a vehicle. For one embodiment, the door assembly includes: a window, a lower door assembly body, an upper door frame and a user capture device. The upper door frame is fixedly attached to the lower door assembly body and surrounding the window. The upper door frame includes a recessed portion in an inner panel of the upper door frame. The recessed portion houses the user capture device for identifying and authenticating users of the vehicle.

Embodiments and examples are disclosed for a vehicle that includes a door assembly. For one embodiment, the door assembly includes: a window, a lower door assembly body, an upper door frame and a user capture device. The upper door frame is fixedly attached to the lower door assembly body and surrounding the window. The upper door frame includes a recessed portion in an inner panel of the upper door frame. The recessed portion houses the user capture device for identifying and authenticating users of the vehicle.

BRIEF DESCRIPTION OF THE DRAWINGS

The appended drawings illustrate examples and are, therefore, exemplary embodiments and not considered to be limiting in scope.

DETAILED DESCRIPTION

Embodiments and examples are disclosed for the placement of user capture devices on a vehicle. For one embodiment, a user capture device is placed on a rear door frame which is in front of a portion of a B pillar of the vehicle. For one example, a recessed portion of an upper portion of the rear door frame houses one or more user capture devices. The user capture device could be a camera device to capture facial characteristics of a user for the purposes of identifying and/or authenticating the user.

As set forth herein, various embodiments, examples and aspects will be described with reference to details discussed below, and the accompanying drawings will illustrate various embodiments and examples. The following description and drawings are illustrative and are not to be construed as limiting. Numerous specific details are described to provide a thorough understanding of various embodiments and examples. However, in certain instances, well-known or conventional details are not described in order to provide a concise discussion of the embodiments and examples.

Figure 1:
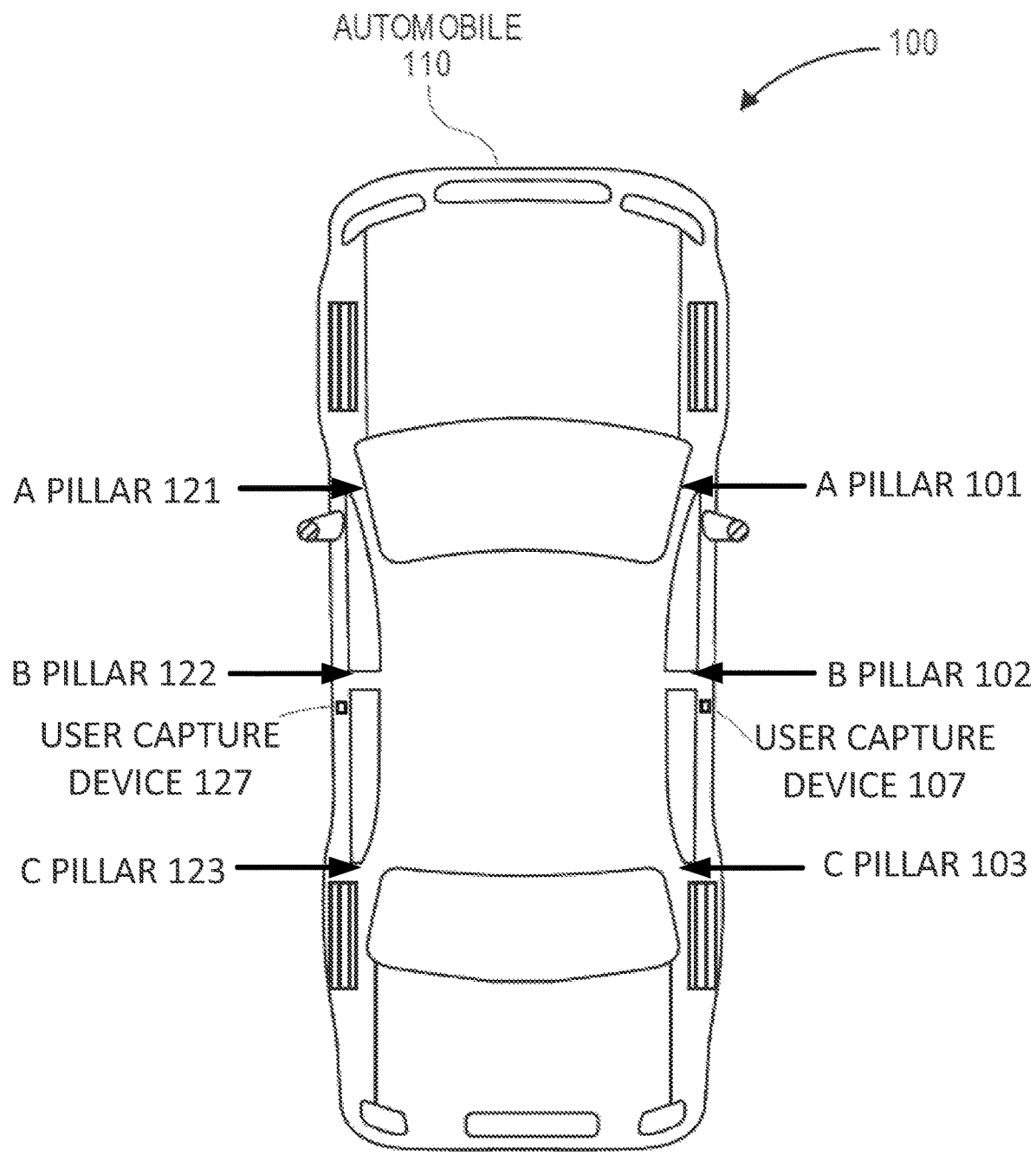
FIG. 1 illustrates an example of a top view of a vehicle having user capture devices according to one embodiment.

FIG. 1 illustrates an example top view 100 of vehicle 110 having user capture devices on the left and right rear door frames of vehicle 110. For one example, one or more users (e.g., drivers or passengers) can have bio-scan information registered to access and use vehicle 110. The bio-scan information can be stored in a secured database or in secured cloud storage. Examples of bio-scan information can include two-dimensional (2D) or three-dimensional images of a user including 2D or 3D facial images of the user.

Registering of bio-scan information for a user can be initiated by an application used to purchase or order vehicle 110. For example, when vehicle 110 is purchased and delivered, an application running on a mobile device that has been authenticated for the vehicle 110, e.g., a mobile phone, tablet computer, laptop computer, etc. with personal identification and password authentication, fingerprint authentication, or two stage authentication, can capture images of the user using one or more cameras on the device and store and register the images in a secured environment for vehicle 110 as a valid user. A registered valid user can be registered as authorized to drive vehicle 110 or restricted from driving vehicle 110. For example, both a husband and wife may be registered to drive vehicle 110, but all the children do not have authorization to drive vehicle 110. For one example, user capture devices of vehicle 110 can include one or more cameras to capture an image of the user and store and register the images for vehicle 110 as a valid user.

Referring to FIG. 1, top view 100 shows vehicle 110 having pillars A, B, and C (101, 102, 103) formed on the right side of vehicle 110 and pillars A, B, and C (121, 122, and 123) formed on the left side of vehicle 110. For one example, user capture devices 107 and 127, e.g., camera devices, can each be mounted on a rear door frame of the vehicle which can be used to identify and/or authenticate users to allow entry and/or access to vehicle 110. User capture devices 107 and 127 can also be used to capture images of one or more users for vehicle 110 as valid users. For example, a user can approach user capture device 107 and initiate a bio-scan registration on an application running on a mobile device that has been authenticated with vehicle 110 in which user capture device 107 captures images of the user to store and register for vehicle 110 as a valid user.

Each user capture device 107 and 127 can include one or more cameras such as, e.g., a stereo camera, RGB (red, green, blue) camera, or infrared cameras, to capture user bio-scan information including 2D or 3D facial images and features and thermal differential information. The cameras can be any type of commercially available camera including respective hardware and software configured to use and implement user identification and/or authentication techniques. For one example, a captured user image can be compared with stored or registered user images, e.g., stored in a database, to determine if the captured image matches a stored image and to authenticate the user as a valid user if a match exists. If authenticated as a valid user, vehicle 110 can allow access and entry to the user. In this way, keys for vehicle 110 are not necessary by having user ID devices 107 and 127 to capture images of a user which are used to detect and recognize valid users, e.g., drivers or passengers of vehicle 110.

From the top view 100 of FIG. 1, user capture devices 107 and 127 is located on respective rear door frames near pillars B (102 and 122) of vehicle 110 to identify and recognize users approaching the right or left side of vehicle 110. For one example, user capture device 107 mounted on a door frame of a rear door of the driver side can detect an approaching driver to determine if the person is a valid and authorized person to access and enter the vehicle. For example, if the user identified and recognized by user capture devices 107 or 127 as a valid user, vehicle 110 can automatically unlock the doors for the user instead of having the user insert or activate keys for vehicle 110.

Figure 2:
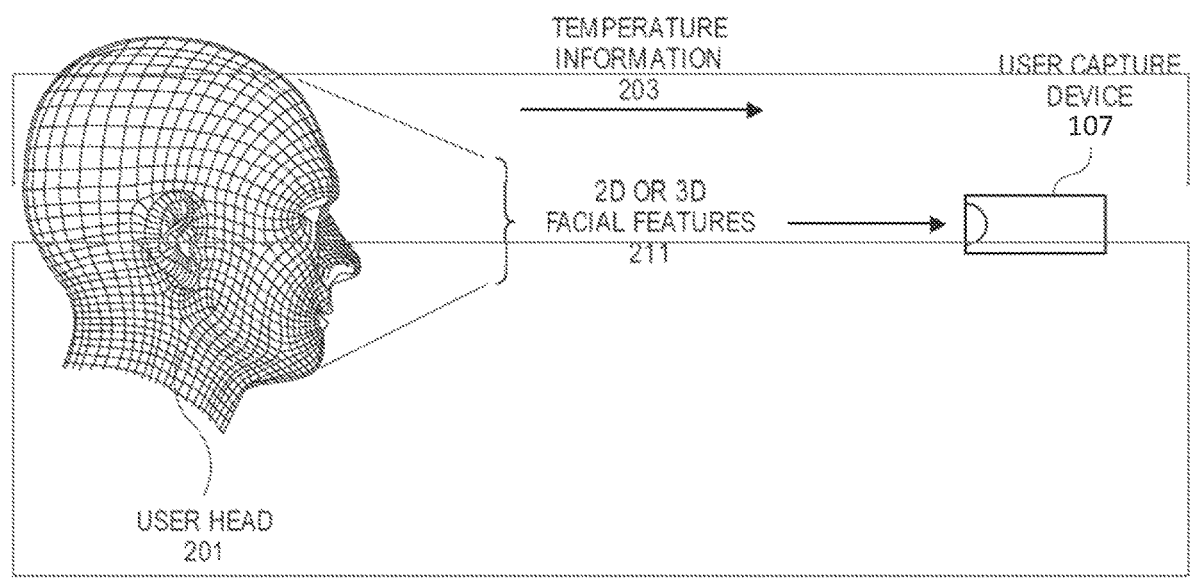
FIG. 2 illustrates an example of capturing user images and features by a user capture device.

FIG. 2 illustrates examples of capturing user images and features by user capture device 107. For one embodiment, user capture device 107 can include an infrared camera that can capture temperature information 203. Referring to FIG. 2, a user head 201 is depicted three-dimensionally. For one example, user capture device 107 can capture two-dimensional (2D) or three-dimensional (3D) images including facial features 211 of user head 201. User head 201 is depicted to illustrate a head of a user, which can be a driver or a passenger for vehicle 110, and identified or recognized by user capture device 107. User capture device 107 can include one or more cameras.

For one example, user capture device 107 can include any type of RGB camera to capture 2D user features (e.g., 2D facial features 211) or a stereo camera to capture 3D user features (e.g., 3D facial features 211) of user head 201. Examples of facial features in user images can include shape, size, and dimensions of, e.g., the nose, mouth, ears, eyes, eyebrows, lips, cheeks, birth marks, face width, head size, hair color, etc. of user head 201. For one example, 2D or 3D user images and facial feature information can be stored during registration of bio-scan information for a user of vehicle 110 which can be stored in a secured database within vehicle 110 or remotely in a secured cloud environment. For one example, user capture device 107 can be used to identify and recognize facial features of user head 201 to determine if such features match those stored in the database for the user in authenticating the user as a valid user for vehicle 110. Any type of facial feature recognition algorithms can be used such as, e.g., open source facial recognition algorithms provided by OpenCV software. For one example, user capture device 107 can capture a facial image of a child that can be a valid passenger of vehicle 110, but vehicle 110 can deny and prevent the child from driver controls and driving vehicle 110.

A computer of the vehicle can also configure settings or preferences for the driver or passenger of the vehicle if authenticated as a valid user. For one example, if user capture device 107 identifies and/or authenticates a user approaching the vehicle as a particular valid user. The computer can configure seat height, backrest inclination angle based on settings and preferences of the particular user. A setting or preference for a user can be stored in a database of the computer of the vehicle. For one embodiment, settings and/or preferences are previously programmed for the particular user. In another embodiment, the settings and/or preferences are configured and used by the particular user from a previous session.

Figure 3:
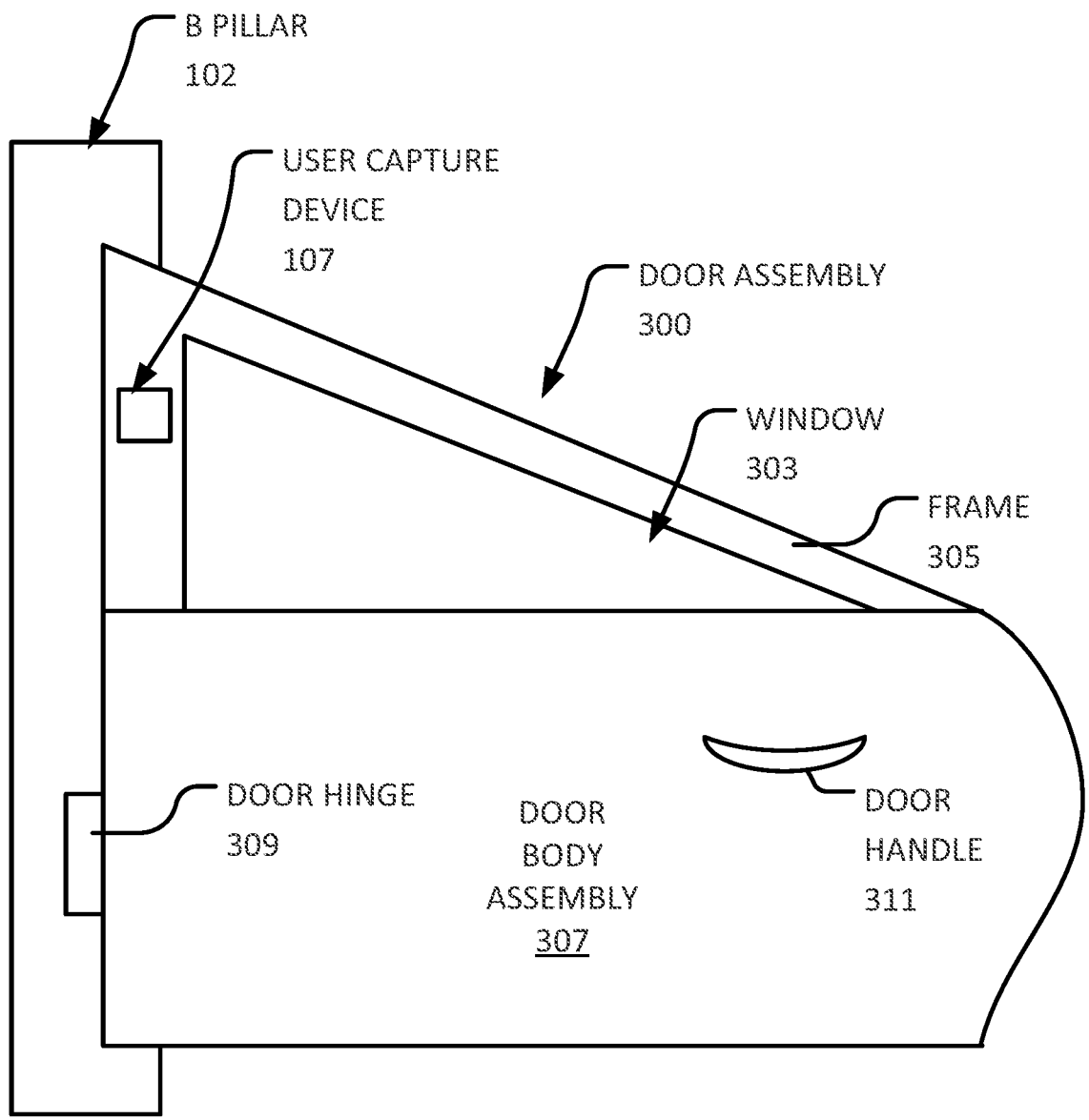
FIG. 3 illustrates an example of a door assembly of a vehicle according to one embodiment.

FIG. 3 illustrates a side view of a door assembly for a vehicle (e.g., vehicle 110). Referring to FIG. 3, door assembly 300 can includes user capture device 107, window 303, frame 305, door body 307, door hinge 309, and door handle 102. For one embodiment, door assembly 300 can be a conventional door assembly for a vehicle. Note, door assembly 300 is not limited to a conventional door and can be a sliding door, scissor door, butterfly door, gull wing door, or canopy door. Referring to FIG. 3, for one example, door assembly 300 is a rear conventional door assembly that includes lower door body assembly 307. Lower door body assembly 307 includes a door hinge 309 at a front facing edge (front of the vehicle) of the door assembly such that door assembly 300 can swing outwards from the body of the car. Lower door body assembly 307 is attached to frame 305. Frame 305 can be molded to surround window 303.

Frame 305 can include an inner panel which a user capture device 107 can be mounted onto. The inner panel can be recessed near a vertical portion of frame 305 to house user capture device 107 so user capture device 107 is not protruding on a surface of frame 305. For one embodiment, the vertical portion of frame 305 can be located near a B pillar 102 of the vehicle 110.

For one embodiment, the user capture device 107 is situated near a vertical axis of door hinge 309. For one embodiment, the user capture device includes one or more camera devices (e.g., infrared, mono, stereo, etc.) to capture facial characteristics of a user for purposes of identifying or authenticating a user. Having user capture device 107 on the side of the door 300 near door hinge 309 means that the user capture device 107 will experience less of a range of motion than being far from hinge 309 at an opposite side of door 300.

For alternative embodiments, however, user capture device 107 can be placed at other locations on door assembly 300. For the embodiment of FIG. 3, user capture device 107 is located on the rear door assembly. For alternative embodiments, user capture device 107 can be located on the front door assembly.

Figure 4:
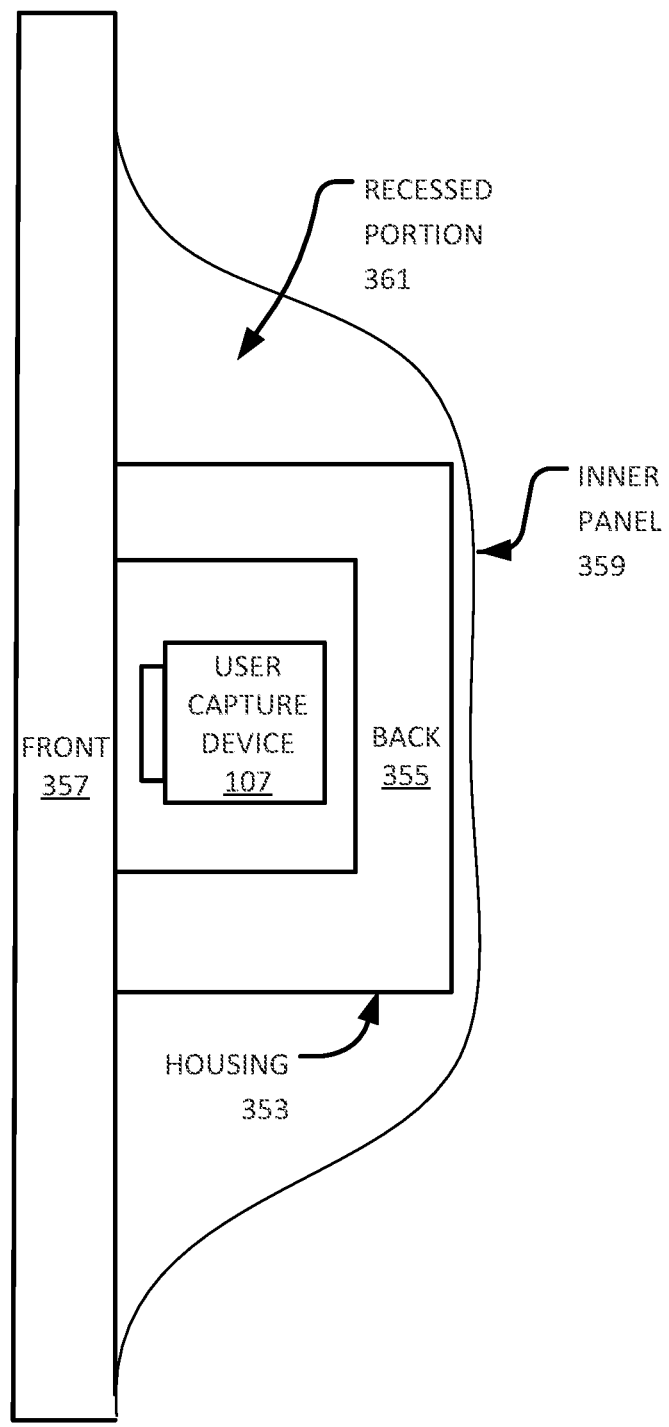
FIG. 4 illustrates a cross sectional view of a user capture device of FIG. 3.

FIG. 4 illustrates a cross sectional view of a mounted user capture device 107 for a vehicle (e.g., vehicle 110). For one example, referring to FIG. 4, inner panel 359 of a door frame has a recessed portion 361 to house user capture device 107. User capture device 107 can include a device housing 353 surrounding user capture device 107 to absorb shock and/or provide stability. Housing 353 can include polymer panels 355-357 (e.g., front and back panels) that surrounds a front and a back portion of user capture device 107 respectively. The front panel 355 can be configured transparent in color. The back panel 357 can be configured black in color. For one embodiment, polymer panels 355-357 can be configured by a two-shot application. For one embodiment, polymer panels include polycarbonate panels. For one embodiment, communications and power wires of user capture device 107 can be situated along inner panels 359 and snaked towards a door hinge of a lower car door body assembly of a vehicle, such as lower door body assembly 307 of FIG. 3, then to a body of the vehicle.

Figure 5:
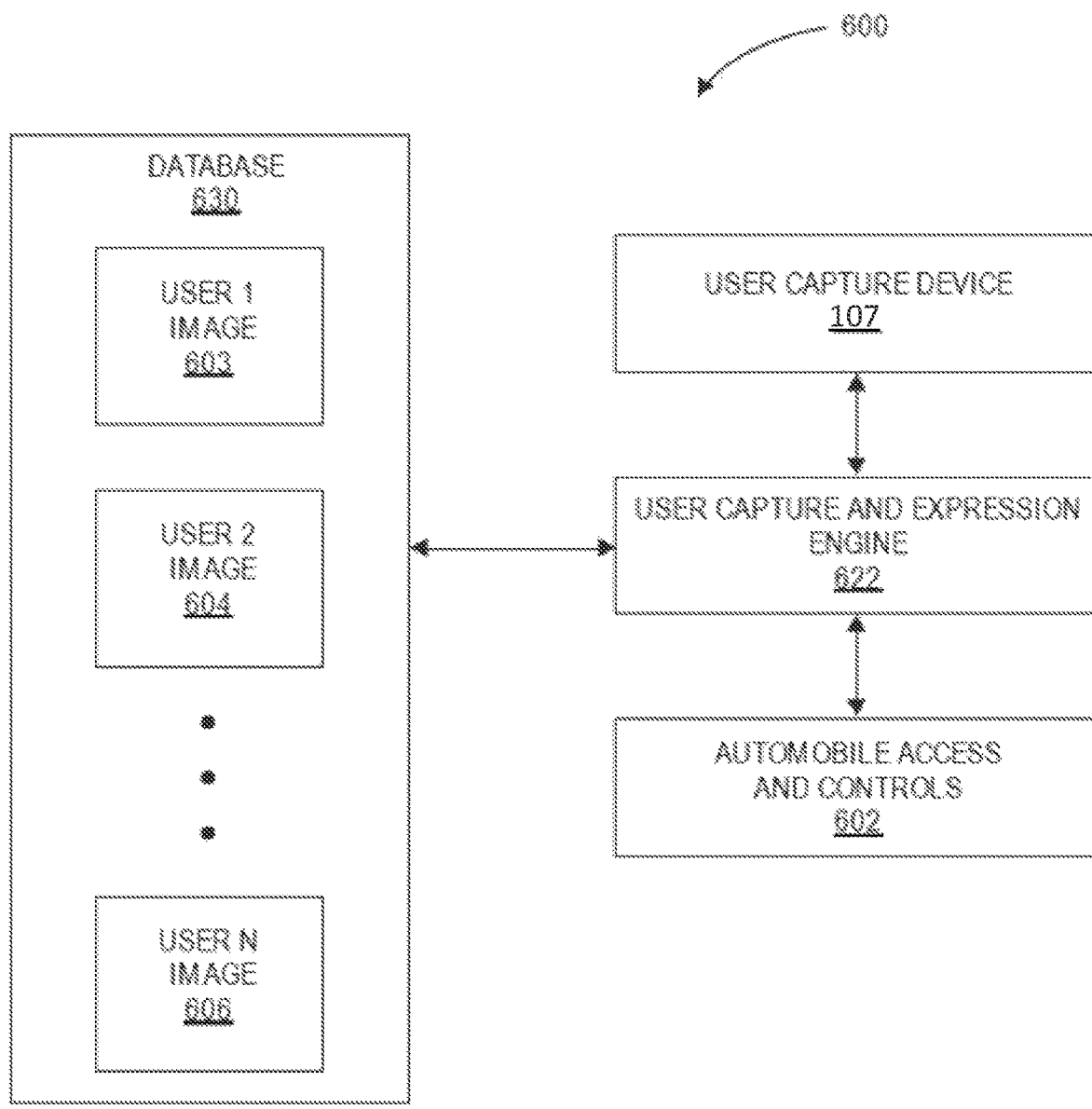
FIG. 5 illustrates a block diagram of a computing system to recognize users and capture user expressions for a vehicle.

FIG. 5 illustrates a block diagram of a computing system 600 to authenticate drivers or users of a vehicle. Computing system 600 includes a memory or database 630 coupled to user capture and expression engine 622. For one example, database 630 stores a plurality of bio-scan user information such as user images including user 1 facial features (603), user 2 facial features (604) up to user N facial features (606). Database 630 can store other types of bio-scan information including 2D and 3D images and facial expressions. Stored facial features can include the shape, size, and dimensions of facial features including, e.g., the nose, mouth, eyes, lips, cheeks, etc. for user 1 (603) to user N (606). For one example, information stored in database 630 can be stored during the registration of bio-scan information of one or more users for a vehicle, e.g., vehicle 110. Database 630 can be a secured storage located within a vehicle or computer or in a secured cloud environment accessible by a user.

For one example, once a user (e.g., a driver or passenger) is situated near by a vehicle (e.g., vehicle 110), user capture device 107 can capture one or more user images. User capture and expression engine 622 can compare the captured user images including facial features with user images stored in database 630 including user 1 facial features (603) to user N facial features (606) to determine if a match exists that have been registered with the vehicle. Engine 622 can use any facial recognition algorithms to recognize user images and facial features. If engine 622 detects a match, engine 622 can authenticate the user as a valid user and further determine if the user has driver credentials to allow to the vehicle including access to controls for driving. For one example, engine 622 can detect a child entering a passenger door and allow the door to unlock, but deny the child access to driving controls of the vehicle. User capture device 107 can also capture user temperature differential information using, e.g., an infrared camera, which can be processed by engine 622 to determine, e.g., a thermal image of a driver or passengers.

In the foregoing specification, the invention has been described with reference to specific exemplary embodiments thereof. It will, however, be evident that various modifications and changes may be made thereto without departing from the broader spirit and scope of disclosed examples and embodiments. The specification and drawings are, accordingly, to be regarded in an illustrative rather than a restrictive sense.

What is claimed is:

1. A door assembly for a vehicle, the door assembly comprising:
   a window;
   a lower door assembly body;
   an upper door frame fixedly attached to the lower door assembly body and surrounding the window, the upper door frame having a recessed portion in an inner panel of the upper door frame; and
   an user capture device housed in the recessed portion in the inner panel of the upper door frame facing an exterior of the vehicle for the purposes of identification or authentication.

2. The door assembly of claim 1, wherein the recessed portion of the upper door frame is situated on a vertical length of the upper door frame, wherein the upper door frame is situated in front of at least a portion of a B pillar structure of the vehicle.

3. The door assembly of claim 1, wherein the user capture device is situated in the recessed portion in the inner panel of the upper door frame on a vertical axis near a door hinge of the lower door assembly body.

4. The door assembly of claim 1, wherein the user capture device includes a camera device to capture facial characteristics of a user for the purposes of identifying or authenticating the user.

5. The door assembly of claim 4, wherein the user capture device includes polymer panels surrounding a back and a front portions of the user capture device.

6. The door assembly of claim 5, wherein the polymer panels are configured by a two shot application.

7. The door assembly of claim 5, wherein the polymer panels surrounding the front portion of the user capture device is transparent in color.

8. The door assembly of claim 5, wherein the polymer panels surrounding the back portion of the user capture device is black in color.

9. The door assembly of claim 5, wherein the polymer panels include polycarbonate panels.

10. The door assembly of claim 1, wherein the user capture device includes a wire assembly situated along the inner panel of the upper door frame.

11. A vehicle comprising a door assembly, the door assembly comprising:
    a window;
    a lower door assembly body;
    an upper door frame fixedly attached to the lower door assembly body and surrounding the window, the upper door frame having a recessed portion in an inner panel of the upper door frame; and
    an user capture device housed in the recessed portion in the inner panel of the upper door frame facing an exterior of the vehicle for the purposes of identification or authentication.

12. The vehicle of claim 11, wherein the door assembly is a rear door assembly of the vehicle.

13. The vehicle of claim 12, wherein the user capture device is positioned in front of an upper door frame of the rear door assembly to identify or authenticate a person situated near a rear door of the vehicle.

14. The vehicle of claim 11, wherein the recessed portion of the upper door frame is situated on a vertical length of the upper door frame, wherein the upper door frame is situated in front of at least a portion of a B pillar structure of the vehicle.

15. The vehicle of claim 11, wherein the user capture device is situated in the recessed portion in the inner panel of the upper door frame on a vertical axis near a door hinge of the lower door assembly body.

16. The vehicle of claim 11, wherein the user capture device includes a camera device to capture facial characteristics of a user for the purposes of identifying or authenticating the user.

17. The vehicle of claim 16, wherein the user capture device includes polymer panels surrounding a back and a front portions of the user capture device.

18. The vehicle of claim 17, wherein the polymer panels are configured by a two shot application.

19. The vehicle of claim 17, wherein the polymer panels surrounding the front portion of the user capture device is transparent in color.

20. The vehicle of claim 17, wherein the polymer panels surrounding the back portion of the user capture device is black in color.

21. The vehicle of claim 17, wherein the polymer panels includes polycarbonate panels.

22. The vehicle of claim 11, wherein the user capture device includes a wire assembly situated along the inner panel of the upper door frame.

\* \* \* \* \*